United States Patent [19]

Wallace

[11] Patent Number: 4,704,050

[45] Date of Patent: Nov. 3, 1987

[54] J-CONFIGURED OFFSHORE OIL PRODUCTION RISER

[75] Inventor: Norman R. Wallace, Walnut Creek, Calif.

[73] Assignee: Bechtel Power Corporation, San Francisco, Calif.

[21] Appl. No.: 571,127

[22] Filed: Jan. 16, 1984

Related U.S. Application Data

[63] Continuation-in-part of Ser. No. 539,246, Oct. 5, 1983, abandoned, which is a continuation-in-part of Ser. No. 521,208, Aug. 8, 1983, abandoned.

[51] Int. Cl.⁴ .......................... E21B 17/01; F16L 1/04
[52] U.S. Cl. .................................... 405/195; 166/367; 405/169
[58] Field of Search ............... 405/169, 170, 195, 166; 166/344, 347, 350, 355, 359, 366, 367

[56] References Cited

U.S. PATENT DOCUMENTS

| | | | |
|---|---|---|---|
| 3,698,199 | 10/1972 | Matthews | 405/169 |
| 4,266,886 | 5/1981 | Milton | 405/169 |
| 4,448,568 | 5/1984 | Gentry et al. | 405/169 |
| 4,459,066 | 7/1984 | Van Der Graaf | 405/195 |
| 4,462,717 | 7/1984 | Falcimaigne | 405/195 |

Primary Examiner—David H. Corbin
Attorney, Agent, or Firm—Townsend and Townsend

[57] ABSTRACT

A riser system having at least one riser with a J-shaped configuration for transporting hydrocarbon fluids from a subsea manifold or wellheads to a surface vessel. The riser has a horizontal section, an upright section, and a sag bend section interconnecting the horizontal and upright sections. The horizontal section is connected at one end to the subsea manifold and extends along and in frictional engagement with the seabed away from the manifold. The upright section has a vertical end part coupled to the surface vessel. The vessel can remain in position with dynamic thrusters or mooring lines, and the vessel remains on station applying horizontal pull to the riser while heading into the prevailing sea and as hydrocarbon fluids are transported from the manifold through the riser to the surface vessel. The horizontal pull on the riser due to the surface vessel is taken up by friction forces between the horizontal section of the riser and the seabed. The riser system can be comprised of a number of risers coupled together in a cluster. In this case, the manifold has a rotatable connector box provided with a number of bores for receiving the lower ends of respective risers.

21 Claims, 10 Drawing Figures

J-CONFIGURED OFFSHORE OIL PRODUCTION RISER

This is a continuation-in-part patent application of Application Ser. No. 539,246, filed Oct. 5, 1983, now abandoned, which was a continuation-in-part application of Application Ser. No. 521,208, filed Aug. 8, 1983, now abandoned.

This invention relates to improvements in the transport of hydrocarbon fluids from subsea manifolds and wellheads to a production vessel and, more particularly, to an improved riser through which such hydrocarbon fluids flow.

BACKGROUND OF THE INVENTION

Vertical risers have been known and used in the past for transporting hydrocarbon fluids, including oil and natural gas, from subsea manifolds and well heads to production vessels on the surface. A vertical riser used for this purpose gives rise to a fundamental problem of station-keeping on the part of a production applied to a vertical production riser by tension devices to keep the riser from failing due to buckling or bending, especially in deep water. The tension force on a vertical riser can increase to relatively high values, such as up to 600 kips in times of heavy weather. Also, the relative high tension requires the use of heave compensators and further require frequent inspection and replacement of segments of the riser due to fatigue.

Another undesirable feature related to the use of a vertical production riser is the wear problem on the joint connecting the lower end of the riser to a subsea manifold. In heavy seas or other emergency situations, it is oftentimes necessary for a riser to be separated from its connection near the seabed. This causes a recoil of the riser which, along with bending of the separated pipe, can cause damage to the pipe and to the production vessel at the upper end of the riser.

Other limitations involved with the use of a vertical riser include the preference for a semisubmersible production vessel to cause a reduction in the wave-induced motions of the production vessel at the expense of deck load capacity; the need for increasing the restraint on the production vessel to keep it within a limited watch circle as riser length is increased; and the need for an elaborate control system for a storage tanker adjacent to the production vessel to avoid the lateral loading of production vessel and riser due to the presence of the storage tanker.

Because of the above drawbacks, a need has arisen for improvements in the construction and configuration of risers for transporting hydrocarbon fluids from subsea manifolds to production vessels on the surface. The present invention is directed to an improved riser for satisfying this need.

A pertinent patent related to the method of laying submarine pipelines is U.S. Pat. No. 3,266,256, issued Aug. 16, 1966.

SUMMARY OF THE INVENTION

The present invention is directed to an improved production riser system which is used to couple a subsea manifold with a production vessel on the surface. The system can include one or a number of risers, depending upon the application to which the system is put or upon the number of delivery lines of an undersea manifold to which the riser or risers of the system are coupled. Each riser of the system has a J-configuration and includes a horizontal section adapted to be laid on the seabed and to be connected at its outer end to a connection box on a pre-founded subsea manifold. A sag bend section couples the other end of the horizontal section with an upright section which extends upwardly to a production vessel on the surface.

The horizontal section of a single riser or one of the risers of a multiple riser system frictionally engages the seabed so that any tendency for the horizontal section to be moved is resisted by the friction forces exerted by the seabed on the horizontal section. The length of the horizontal section is selected so that such friction forces counteract most if not all of the horizontal pull on the riser by the production vessel. The vessel remains in position with dynamic thrusters or mooring lines or both. As it remains on station, the vessel applies horizonal pull to the riser while heading into the prevailing sea as the hydrocarbon fluids are transported from the manifold through the riser to the production vessel. The riser of the present invention thereby eliminates the fundamental problem of station-keeping on the part of the production vessel by a conventional vertical production riser to keep the conventional riser from failing due to buckling or bending, especially in deep water.

The primary object of the present invention is to provide an improved riser system formed of a single riser or a number of risers for coupling a subsea manifold or collection of wellheads with a production vessel on the surface wherein each riser of the riser system has a J-shaped configuration to present a horizontal section and an upright section with the horizontal section of the single riser or one of the risers of a multiple riser system being adapted to frictionally engage the seabed while the upright section is adapted to be coupled to the production vessel, whereby the horizontal pull applied to the riser or risers by the production vessel while heading into the prevailing sea will be countered by the friction forces exerted on the horizontal section of the riser frictionally engaging the seabed to thereby avoid the station-keeping problem on the part of the vessel and to avoid excessive bending stress with minimal tension on the riser.

Another object of the present invention is to provide a riser system of the type described in combination with a subsea manifold and a production vessel wherein the riser system has a horizontal riser section which frictionally engages the seabed as hydrocarbon fluids are transported from the manifold through the riser system to the production vessel and as the horizontal forces applied to the riser system by the production vessel are equalized by the friction forces between the seabed and horizontal riser section.

Another object of the present invention is to provide a method of laying a J-configured riser system wherein the riser system is laid in an efficient manner on a seabed while minimizing costs and without increasing the possibility of damage to manifold structure on the seabed.

Other objects of this invention will become apparent as the following specification progresses, reference being had to the accompanying drawing for an illustration of the invention.

IN THE DRAWINGS

Figure 1:
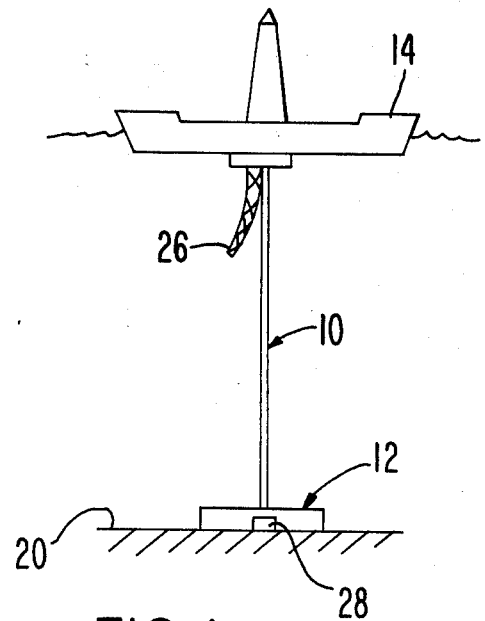
FIG. 1 is a schematic, side elevational view of a surface ship having a single production riser extending downwardly therefrom to a subsea manifold and connected to the manifold, the view showing a first step in the formation of the J-configured production riser of the present invention.

A first embodiment of a J-configured offshore production riser system of the present invention is broadly denoted by the numeral 8 and includes a single riser 10 which is used to connect a subsea manifold 12 with a surface vessel 14 to permit hydrocarbon fluids or other to be transported from the manifold to the surface production vessel. Riser 10 is especially adapted for offshore use in deep water, such as depths of over 10,000 feet. It is also especially suitable for use in ice-infested waters, since the single riser 10 of system 8 can be laid on the seabed and the production vessel can depart if ice forces become threatening.

Riser 10 is comprised of a string of pipe segments 11 (FIGS. 1-3) which are welded, screwed or otherwise joined together in end-to-end relationship. The pipe segments may have any diameter but would typically have a diameter of the order of magnitude of 12 inches or more to transport commingled production from several wells.

Figure 2:
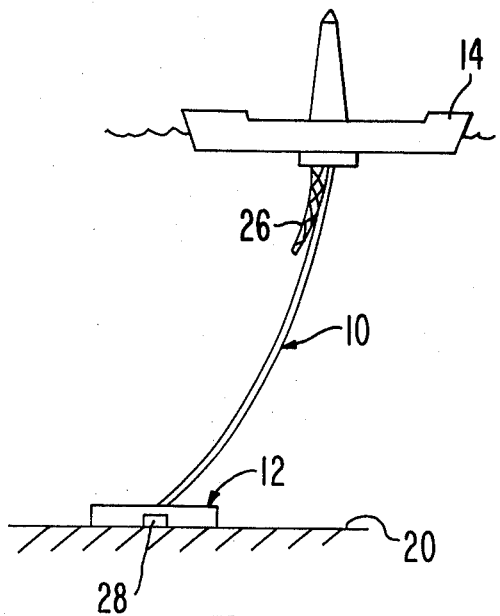
FIG. 2 is a view similar to FIG. 1 but showing the increase in the length of the riser and its inclination during a second step in the sequence in the formation of the riser of the present invention.
Figure 3:
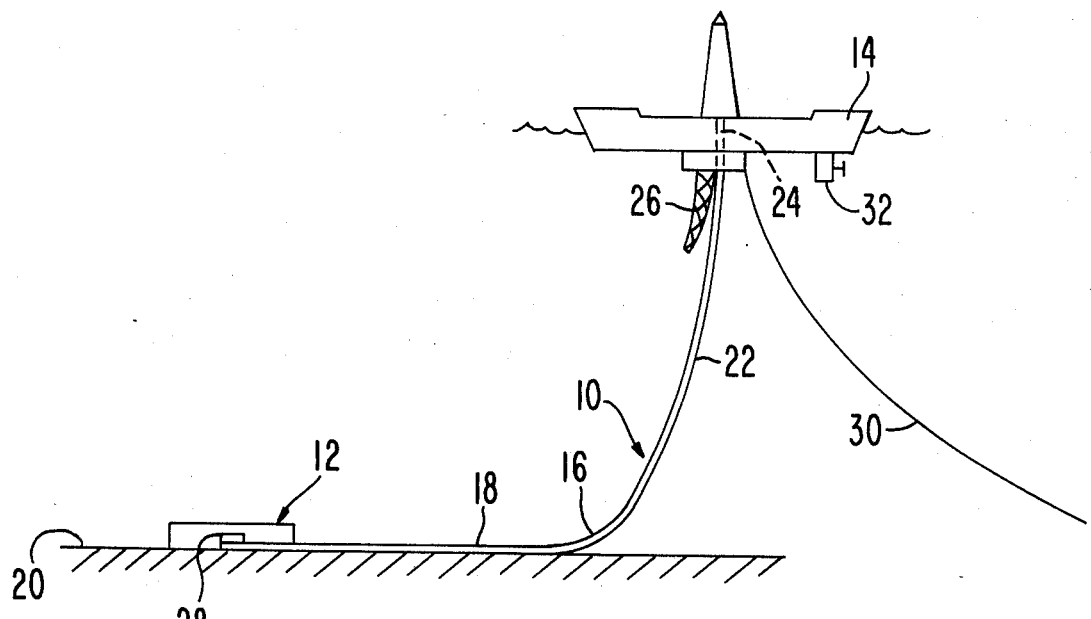
FIG. 3 is a view similar to FIGS. 1 and 2 but showing the completed J-configured production riser in an operative position.

Riser 10 has a sag bend section 16 intermediate its ends, one end of the riser being coupled to the manifold and the other end of the riser being coupled to the surface vessel 14. A horizontal section 18 of riser 10 coupled to sag bend section 16 lies on and is in frictional engagement with the seabed 20. A second upright section 22 extends upwardly from sag bend section 16 and is coupled to the surface vessel 14. The overall shape of the suspended portion of the riser is that of a stiffened catenary. The upper end of section 22 is denoted by the numeral 24 and is kept in a vertical or near vertical position by virtue of a vertical moment limiter 26 carried by the surface vessel and extending downwardly therefrom as shown in FIGS. 1-3. The limiter 26 is used in conjunction with a turret or rotating turntable to allow the vessel to rotate relative to the riser. Alternatively, the riser may be attached to the production vessel in a gimballed derrick or a pivotal slant-ramp also used in conjunction with a turret or rotating turntable.

A turret or rotating turntable to allow the vessel to rotate relative to the riser can be of any suitable construction; however, for purposes of illustration, it comprises a swivel unit 13 (FIG. 11) of the type substantially of the same construction as the swivel unit shown in U.S. Pat. No. 3,840,927 issued Oct. 15, 1974 and entitled "Swivel Unit for Mooring and Cargo Transfer System."

Swivel unit 13 is coupled in any suitable manner to vessel 14, such as by vertical support shaft 15 which is rigidly secured at its upper end to some part of the vessel and depends therefrom. Shaft 15 is surrounded by an upper, cylindrical, hollow fluid transfer member 17 and a lower, generally cylindrical, hollow fluid transfer member 19 which is rotatable relative to member 17. A thrust bearing 21 is carried on support shaft near the lower end thereof and rotatably mounts lower fluid transfer member 19 on support shaft 15 for rotation about the longitudinal axis of support shaft 15.

An interior, tubular wall 23 forms a part of lower fluid transfer member 19 and is rotatably coupled at its upper end to support shaft 15 by a rotary bearing 25. Member 19 has a pair of fluid inlets 27 and 29 to one of which riser 10 can be coupled. If riser 10 is formed of two sections, both inlets 27 and 29 will be used. Fluid inlets 27 and 29 are, respectively, in fluid communication with regions 35 and 37 within member 19, there being a partition (not shown) isolating region 35 from region 37. Upper fluid transfer member 17 has a pair of fluid outlets 39 and 41, respectively, coupled with pipes 43 and 45 which are coupled with fluid holding tanks (not shown) on or in vessel 14.

The upper wall 47 of member 17 is coupled by an annular flange 51 to vessel 14 in any suitable manner. Thus, member 17 is rigidly secured to the vessel and rotates with the vessel and shaft 15 relative to member 19.

Fluid inlets 39 and 41 are in fluid communication with regions 35 and 37, respectively. Thus, fluid entering inlet 27 will flow out of outlet 39, and fluid entering inlet 29 will flow out of outlet 41.

Bearings 49 and 51 are provided to rotatably couple member 19 with member 17. Moreover, rotary seals 53 are mounted between members 17 and 19 to provide fluid-tight, relatively shiftable junctions therebetween.

Manifold 12 is of any conventional design. It rests on seabed 20 and has a connection box 28 to which the adjacent end horizontal section 18 is connected.

In use, riser 10 transports hydrocarbon fluids, including oil and natural gas, from manifold 12 to surface vessel 14. Typically, the natural gas is separated from the oil at surface vessel 14 and reinjected into the seabed 20, used as fuel gas or flared, while the oil typically is directed to a storage tanker (not shown) tethered or otherwise coupled to surface vessel 18. Alternatives would include combining storage and production in one vessel or pipelining hydrocarbons on the seabed to another moored vessel or to shore.

During the transfer of the hydrocarbon fluids through riser 10, the surface vessel 14 is held in a substantially fixed position relative to manifold 12 by mooring lines 30. During heavy weather, one or more dynamic thrusters 32 carried by surface vessel 14 can be used to provide a horizontal pull on the surface vessel. In either case, the horizontal pull, using mooring lines 30 or thrusters 32, is in the range of 1 kip to 150 kips.

Thus, using riser 10 of the present invention, it is possible to eliminate the fundamental problem of station-keeping on the part of the surface vessel and minimize the tension required on production riser 10. This is mainly achieved by using the frictional force between the seabed and the horizontal section 18 of riser 10 to substantially eliminate all of the horizontal pull on the manifold and its connection. This action protects the connection of riser 10 to manifold 12 and assures that surface vessel 14 will remain on station, applying horizontal pull to the riser while heading into the prevailing sea as hydrocarbon fluids are transported from the manifold through the riser to the surface vessel.

In the formation of riser 10, a vertical, rigid pipe comprised of pipe sections welded, screwed or otherwise joined together is stabbed vertically from surface vessel 14 into connection box 28 of manifold 12. Then, additional pipe segments are added to the pipe and the surface vessel is moved away from a position vertically aligned with the manifold as shown in FIG. 1. As shown in FIG. 2, the length of the pipe has increased, a sag bend is taking form in the riser, and the surface vessel 14 has moved to an intermediate station laterally of a position vertically aligned with manifold 12. Top tension is maintained on the riser during this stage of assembly. Finally, as additional pipe segments are added to the riser, the length of the riser increases and, due to its inherent flexibility, a portion of the riser, namely horizontal section 18, is laid progressively on the seabed. The length of horizontal section 18 is calculated to assure that most if not all of the horizontal pull from the surface vessel 14 is taken up by the friction forces between the seabed and horizontal section 18. The vessel then remains in position with mooring lines 30 attached to the vessel and extending downwardly therefrom to anchor positions (not shown). Thrusters 32 can be used with the mooring lines in heavy seas. The riser in the J-configuration shown in FIG. 3 can remain in this configuration indefinitely while hydrocarbon fluids are transported through the riser and while the surface vessel supports only the weight of the riser and its contents and maintains horizontal pull.

An alternate technique of assembling the single riser is to establish the J-configuration of the riser by anchoring the lower end of the riser to the seabed or to the manifold by a cable. Then the riser is laid out under horizontal pull as described above. The lower end of the riser can then be pulled into connection with the manifold; then, further laying of pipe on the seabed can continue until the desired amount of horizontal pull is taken up by friction forces on the seabed.

Figure 4:
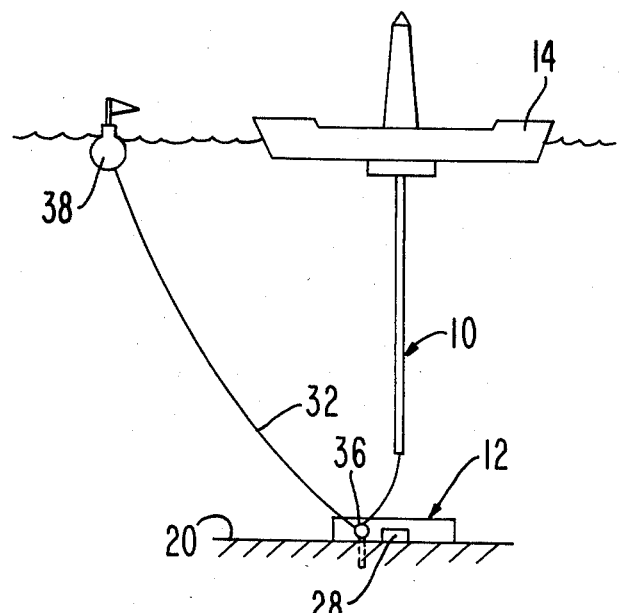
FIG. 4 is a view similar to FIG. 1 but showing an improved technique for coupling a single riser to a subsea manifold.
Figure 5:
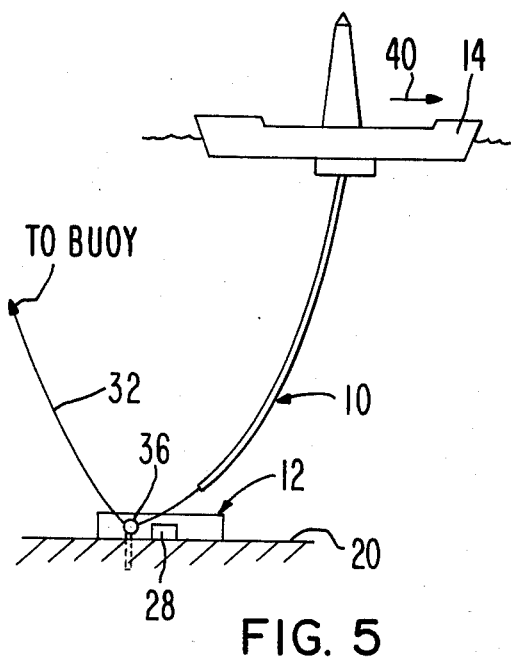
FIG. 5 is a view similar to FIG. 4 but showing a later stage in the connection of the riser to the manifold.
Figure 6:
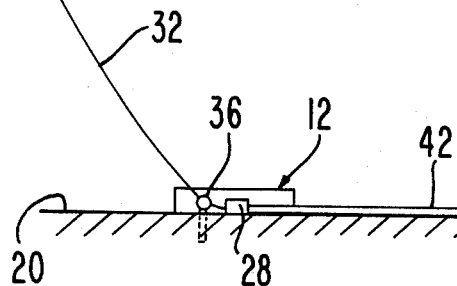
FIG. 6 is a view similar to FIGS. 4 and 5 but showing the riser connected to the manifold and forming a J-configuration.

This alternate technique is illustrated in FIGS. 4–6 in which a surface ship 14 drops a cable 32 to the seabed 34 and the lower end of the cable is anchored by some suitable means on the seabed to the manifold. For example, the cable can be anchored to seabed 20, such as by a hold-down sheave 36 attached to a pile which is driven into the seabed. One end of the cable is coupled to a buoy 38 which floats on the water surface and the other end of the cable is attached to ship 14.

In another embodiment, the cable can pass through the connector box 28 of manifold 12. Thus, the connector box 28 need not be rotatable as is required in performing the technique described in FIGS. 1–3. Thus, bearing or other structural problems associated with the connector box are avoided by using the technique shown in FIGS. 4–6.

As the surface ship 14 moves in the direction of arrow 40, the pipe is continually laid down and caused to follow along the cable. This requires that the length of the cable increase. As surface vessel 14 continues to move in the water, the horizontal portion 42 of the riser lies on the seabed. Then, the cable is released from buoy 38 and coupled to another surface vessel 44 which moves in the opposite direction of arrow 46, causing the riser to be pulled to the connection box 28 and coupled thereto. Then the cable is released from vessel 14 and is reeled in onto vessel 44. Thereafter, the riser is continued to be laid by surface vessel 14 until the desired length of the riser is in contact with seabed to provide the necessary frictional pull on the riser to offset the pull of surface vessel 14.

In comparing the operational characteristics of the J-configured riser 10 with those of a conventional vertical riser, a number of desirable features not available with the use of a vertical riser can be realized with riser 10. For instance, with a vertical riser, it is necessary to apply a tension of up to 600 kips in times of heavy weather to prevent buckling of the riser. With riser 10, the horizontal pull, using mooring lines 30 or thrusters, can be in a range as low as 1 kip to 140 kips in heavy weather. To compensate for heave, a surface vessel using a vertical riser must have tensioner devices which are active heave compensators. By comparison, using riser 10, no such tension or devices are required.

When using a vertical riser of conventional design, relatively large tension forces are continuously applied to the riser itself. This requires frequent inspection of the riser and replacement of certain riser sections as they approach fatigue limits. By comparison, riser 10 is under no such high, continuous tension. In riser 10, stress points are located at the sag bend 16. The affected pipe is changed only occasionally by adding or removing one or more segments of the riser at the surface vessel 14.

Using a conventional vertical riser, wear problems frequently occur for the articulated or ball joint connection at the manifold on the seabed. No such wear problems exists using riser 10 because horizontal section 18 of the riser is immobilized because it frictionally engages the seabed. Thus, there will be no relative movement between horizontal section 18 of riser 10 and manifold 12, thereby eliminating the wear problems associated with the ball joint connections of the conventional vertical riser.

With a conventional vertical riser, it is often necessary to separate the lower end of the riser from the manifold, such as during heavy seas or the like. This creates a dangerous situation in deep water because of the hang-off of the riser below the surface vessel. Separation causes recoil of the riser, which, along with the suspended pipe hanging from the surface vessel, can cause damage to the production vessel. With the J-configured riser 10 of the present invention, no hang-off problems can arise. The reason for this is that the riser is laid on the seabed and need not be separated from the manifold during heavy weather or ice encroachment.

Using a conventional vertical riser, the surface vessel to which the riser is coupled is limited in capacity and is usually chosen to be a semi-submersible type so as to reduce vessel motions. This is done at the expense of deck load capacity which typically for a semi-submersible has an upper limit in the range of 6000 to 7000 tons.

By contrast, the surface vessel 14 using the J-configured riser 10 of the present invention can have a ship-shape hull to maximize capacity. Such capacity can be 100,000 tons or more.

Using a conventional vertical riser, there is a limited watch circle in which the surface vessel can move. However, with increasing length of the riser or increasing depth to which the riser must extend, there must be an increase in the restraint on the surface vessel in the watch circle to avoid unduly high lateral loads on the riser. When using riser 10 of the present invention, no such problem exists because the riser 10 can withstand relatively large applied lateral displacement correlated to the lateral load and owes its dynamic and static stability to the lateral pull applied.

Using a conventional vertical riser, there are strict control requirements with respect to the positioning of a storage tanker relative to the production vessel to which the vertical riser is connected. If the storage tanker is tethered to the production vessel, severe demands are placed on the control system of the tanker to avoid lateral loading of both the production vessel and the riser. Control of the tanker is simplified by the use of riser 10 of the present invention by correlating the lateral forces applied to the production vessel and the riser with the horizontal displacement of the production vessel. Thus, using riser 10, the control is achieved at minimum expense in equipment and manpower to assure the proper control of the storage tanker relative to the production vessel.

Using a conventional vertical riser, there can be no production during template-well workover. With riser 10 of the present invention, production can continue inasmuch as a separate vessel performs the workover and does not interfere with transfer of hydrocarbon fluids to the production vessel itself.

Figure 7:
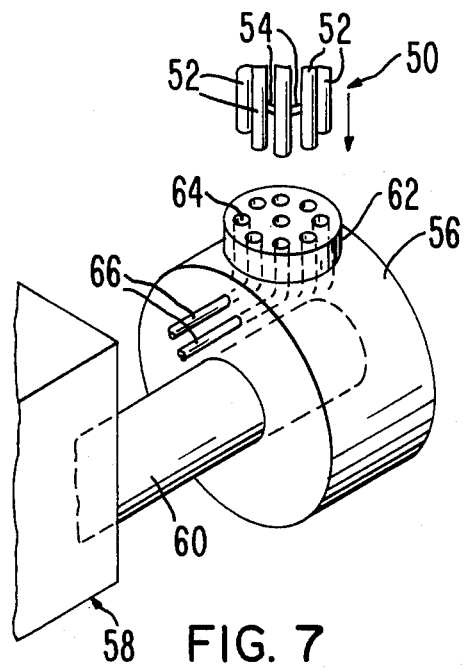
FIG. 7 is a fragmentary, perspective view of a multiple riser system and the connector on a subsea manifold for receiving the lower ends of the risers of the system as the risers are stabbed into the connector.
Figure 8:
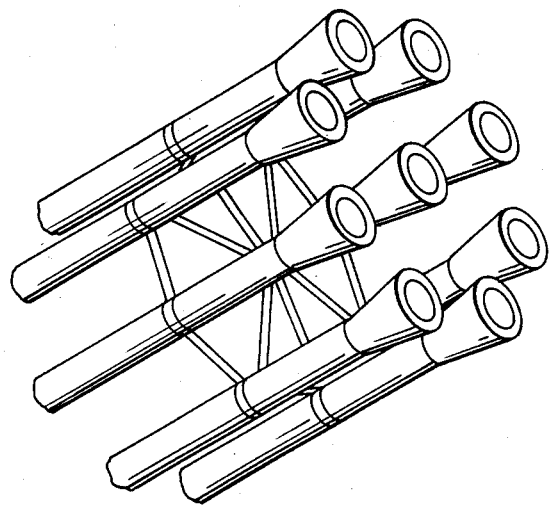
FIG. 8 is a perspective view of the upper end of the risers of the multiple riser system, showing the way in which the risers are coupled together in a cluster.
Figure 9:
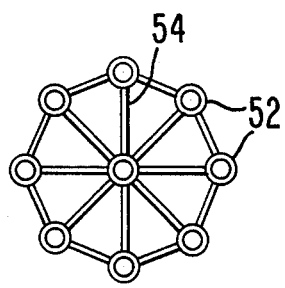
FIG. 9 is an end elevational view of the upper ends of the risers of FIGS. 7 and 8.

A multiple production riser system 50 is shown in FIGS. 7-10 and includes a plurality of risers 52 which are formed in the same manner as that described above with respect to riser 10. Each riser 52 is connected in any suitable manner in a cluster with adjacent risers 52, such as by braces 54 at various locations along the lengths of the risers. The cluster of risers 52 can be of any configuration, such as that shown in FIGS. 8 and 9 in which a central riser 52 is surrounded by a group of risers 52. For purposes of illustration, there are nine risers 52 in the cluster as shown in FIGS. 8 and 9.

The lower ends of the risers 52 are stabbed into a connector 56 (FIG. 7) of an undersea manifold. To this end, connector 56 is rotatably mounted on a shaft 60 projecting laterally from manifold 58. Connector 56 has a distributor member 62 provided with bores 64 for receiving the lower ends of respective risers 52 as the risers are stabbed into the bores. Each bore 64 has a pipe 66 leading away therefrom to an undersea well for receiving a hydrocarbon fluid from the well.

Connector 56 is rotatable about the longitudinal axis of shaft 60 from a position in which member 62 is at the upper end of its path of travel so that the open ends of bores 64 are vertically aligned with respective risers 52. Thus, as the risers descend from a surface vessel thereabove, the risers can enter respective bores 64 and thereby be interconnected with respective pipes 66 leading to the various undersea wells to which pipes 66 are coupled. The connector 56 can then rotate relative to manifold 58 as the surface vessel to which the risers 52 are coupled moves in a direction relative to manifold 58. FIGS. 1-3 show sequentially the way the surface vessel can move from a position directly above the manifold to a position laterally spaced from and above the manifold.

Figure 10:
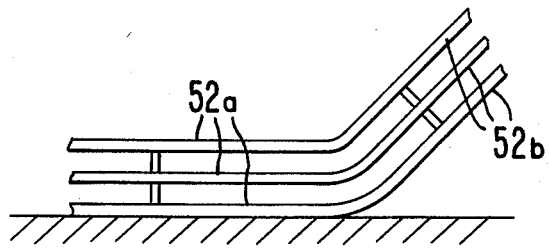
FIG. 10 is a fragmentary, side elevational view of a group of the risers of the multiple riser system, showing the way in which the risers form a J-configuration after the risers have been coupled to the connector of the subsea manifold and extend upwardly to a surface vessel.

In the use of the system 50, connector 56 is initially in the position shown in FIG. 7. Thus, as risers 52 are formed from the surface vessel, the risers are caused to be lowered so that the lower ends of the risers enter respective bores 64 thereby becoming connecting to respective pipes 66. Then, the surface vessel is moved laterally relative to manifold 58 and in doing so, the risers 52 begin to lean or become inclined in the manner shown in FIG. 2. Eventually, the risers will be arranged as shown in FIG. 10 with certain sections thereof, namely sections 52a, being generally horizontal and sections 52b being generally inclined and extending upwardly to the surface vessel itself. At least one of the horizontal sections 52a will frictionally engage the seabed as shown in FIG. 10 so that any tendency for the horizontal sections 52a to be moved is resisted by the friction forces exerted by the seabed on the horizontal section 52a which engages the seabed. The length of the horizontal section engaging the seabed is selected so that such friction forces counteract most, if not all, of the horizontal pull on the riser by the production vessel. The vessel remains in position with dynamic thrusters or mooring lines or both. As it remains on station, the vessel applies horizontal pull to the risers 52 while heading into the prevailing sea as the hydrocarbon fluids are transported from the manifold, through the various risers, to the production vessel.

What is claimed is:

1. Apparatus for use in transporting hydrocarbon fluids from subsea wellheads or a manifold to a movable production vessel comprising: a formed-in-place riser of rigid pipe and having a horizontal section, a sag bend section and an upright section, the horizontal section having means for attaching the riser to the subsea manifold, the upper end of the upright section having means for coupling the same to the production vessel, the sag bend section having only a single sag bend and defining a smooth transition between the horizontal section an the upright section, the horizontal section being adapted to frictionally engage the seabed, the sag bend section being free of any structure for connecting it to the seabed, said coupling means being the only means for connecting the upright section to the production vessel.

2. Apparatus as set forth in claim 1, wherein the production vessel exerts a horizontal pull on the horizontal section, the length of the horizontal section being sufficient to cause the frictional forces between the seabed and the horizontal section to counter the horizontal pull on the riser by the production vessel.

3. In combination, a subsea manifold having a connection box for placement on the seabed; a surface vessel; and a J-configured riser system including a formed-in-place riser of rigid pipe segments extending between and coupled at the ends thereof to the manifold and the surface vessel, respectively, the riser having a horizontal section, a curved sag bend section and an upright section, the sag bend section having only a single sag bend coupling the horizontal section to the upright section, said sag bend section being free of any structure for connecting it to the seabed, said horizontal section being coupled to the connection box of the manifold and adapted to be placed in frictional engagement with the seabed adjacent to the manifold, the riser being free of anchoring structure between the ends thereof.

4. The combination as set forth in claim 3, wherein the riser is comprised of interconnected riged pipe segments.

5. The combination as set forth in claim 3, wherein is included means for holding the surface vessel in a substantially fixed position relative to the manifold while exerting horizontal pull on the riser system.

6. The combination as set forth in claim 5, wherein said system includes a number of risers, and means coupling the risers together in a cluster.

7. The combination as set forth in claim 5, wherein said connector box is rotatably mounted on the manifold and has a number of bores for receiving the lower ends of respective risers.

8. The combination as set forth in claim 3, wherein the length of the horizontal section is sufficient to assure that substantially all of the horizontal pull on the riser by the surface vessel will be counteracted by the frictional forces between the sea bed and the horizontal section.

9. A method of coupling a subsea fluid manifold having a connector box to a movable surface vessel comprising: providing a riser system of rigid pipe segments extending downwardly from the surface vessel; coupling the lower end of the riser system to the connection box of the subsea manifold; increasing the number of segments and thereby the length of the riser system while moving the surface vessel in the water and as the riser system remains coupled to the connector box, said increasing step including laying a section of the riser system on the seabed and forming a single sag bend in the riser system as the surface vessel moves toward a fixed position relative to the manifold; and keeping the riser system near the sag bend free of structure for connecting it to the seabed.

10. A method as set forth in claim 9, wherein the surface vessel exerts a horizontal pull on the horizontal section, the laying step continues until the frictional force between the seabed and the horizontal section of the riser system are sufficient to counteract the horizontal pull on the upper end of the riser system by the surface vessel.

11. A method as set forth in claim 9, wherein is included the step of holding the surface vessel at the operative position thereof.

12. A method as set forth in claim 11, wherein is included the step of applying thrust forces to the surface vessel to maintain the same in said fixed position relative to the manifold.

13. A method as set forth in claim 9, wherein the depth of the water in which the riser is placed is in the range of 200 to at least 7000 feet or more.

14. A method as set forth in claim 11, wherein is included the step of adding another pipe segment to the upper end of the riser system to change the location of the sag bend along the length of the riser system.

15. A method as set forth in claim 11, wherein is included the step of removing pipe segment from the upper end of the riser to change the location of the sag bend along the length of the riser.

16. A method as set forth in claim 9, wherein the coupling step is performed before said length increasing step.

17. A method as set forth in claim 9, wherein said coupling step is performed after said length increasing step.

18. A method as set forth in claim 17, wherein said length increasing step includes anchoring the lower end of the riser system to the seabed, and laying out the riser system under horizontal pull, said coupling step including pulling the lower end of the riser system into the connector box, said length increasing step being continued after said coupling step until the amount of pull is taken up by friction force on the seabed.

19. A method as set forth in claim 9, wherein said riser system includes a single riser.

20. A method as set forth in claim 9, wherein said riser system includes a number of risers coupled together in a cluster, said laying step including placing at least one of the risers on the seabed in frictional engagement therewith.

21. A method as set forth in claim 20, wherein said coupling step includes connecting the lower ends of the risers simultaneously with the connector box, said length increasing step including rotating the connector box relative to the manifold.

* * * * *